Figure 1:
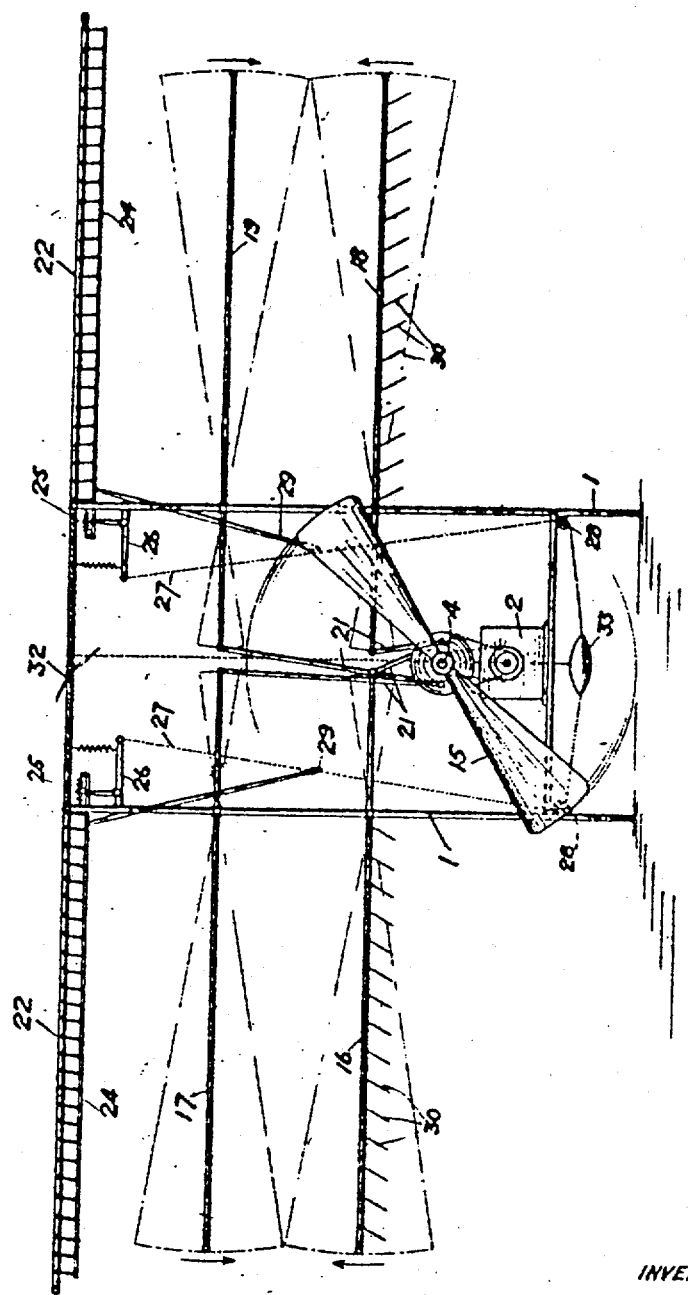

M. D. COMPTON.
FLYING MACHINE.
APPLICATION FILED AUG. 19, 1909.
986,364.
Patented Mar. 7, 1911.
2 SHEETS—SHEET 2.
FIG. 2.
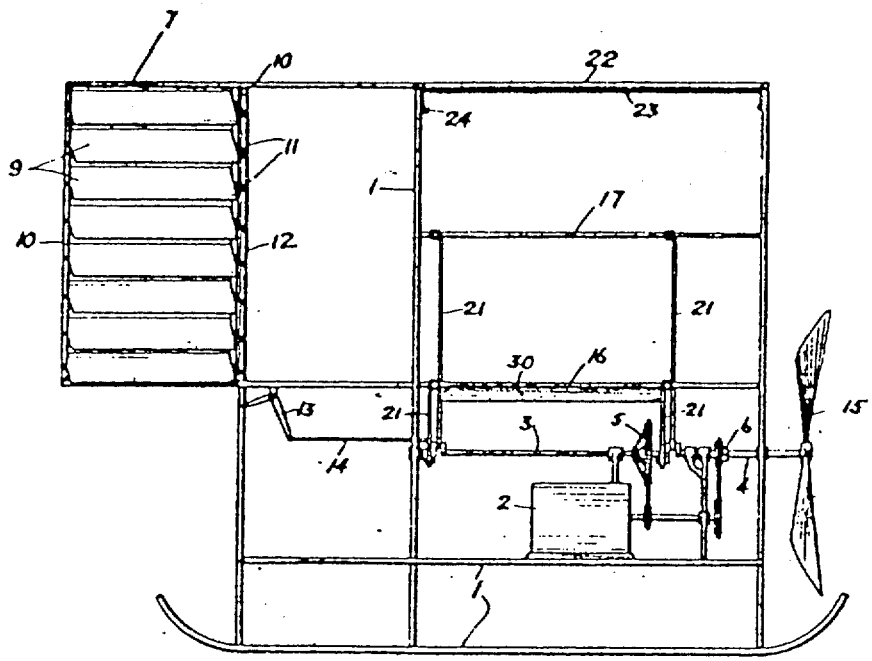
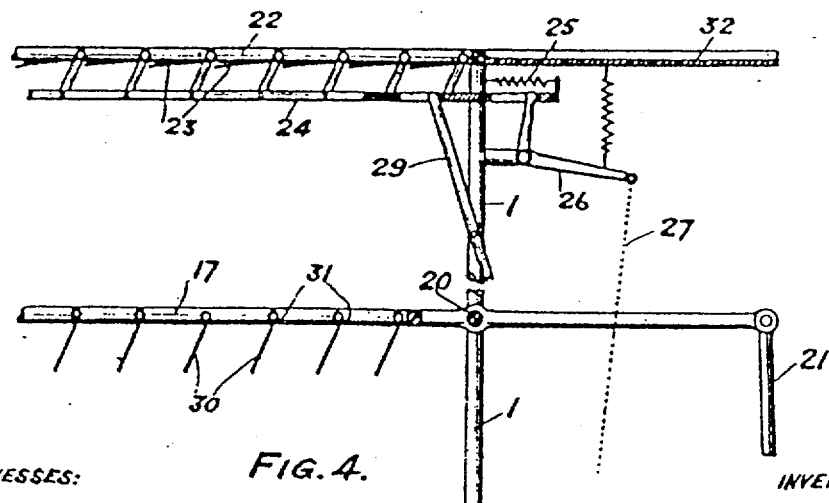
FIG. 4.
WITNESSES:
INVENTOR
Melvin D. Compton
BY
Augustus B Stoughton
ATTORNEY.

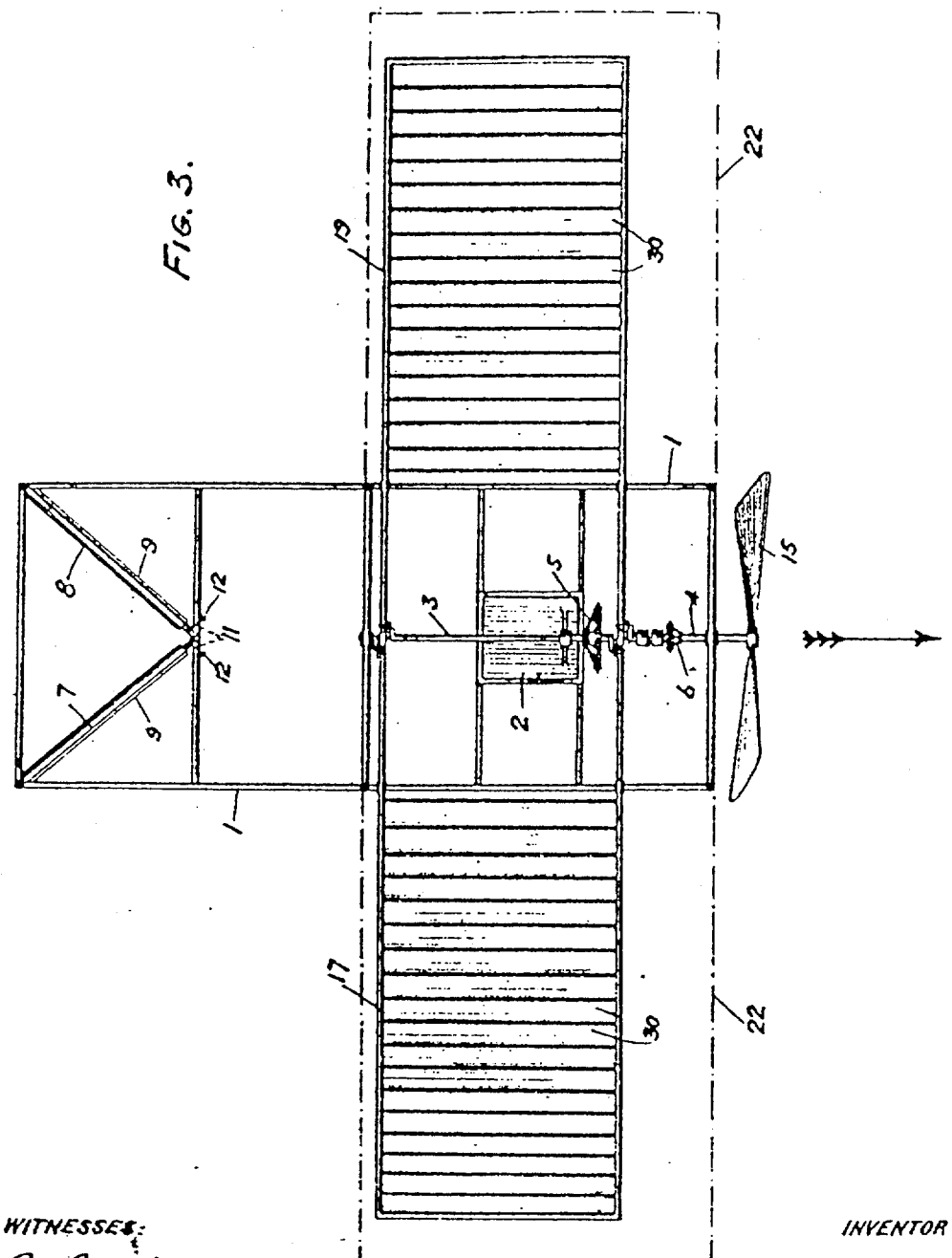

986,364. FLYING-MACHINE. MELVIN D. COMPTON, New York, N. Y. Filed Aug. 19, 1909. Serial No. 513,557.

*To all whom it may concern:*

Be it known that I, MELVIN D. COMPTON, a citizen of the United States, residing at the city of New York, in the county of New York and State of New York, have invented certain new and useful Improvements in Flying-Machines, of which the following is a specification.

Objects of the present invention are to provide a flying machine which can start by lifting itself without a running or gliding motion, can pause and travel in midair and descend and alight without shocks or jars and in any desired place and which automatically adjusts or balances itself and which is readily dirigible notwithstanding the presence of wind and drafts of air.

The invention will be claimed at the end hereof but will first be described in connection with the embodiment of it chosen for illustration in the accompanying drawings in which—

Figure 1, is an end view of a machine embodying features of the invention. Fig. 2, is a side view of the same. Fig. 3, is a top or plan view with parts broken away showing in broken lines the outline of the top plane, and Fig. 4, is an end view drawn to an enlarged scale and showing details of construction.

In the drawings 1, is a frame shown as of generally rectangular form and consisting of rails or rods. This frame carries a motor 2, a crank shaft 3, and a propeller shaft 4, mounted to revolve in suitable bearings.

5 and 6, are clutches by means of which the shafts 3 and 4, may be connected with and disconnected from the motor.

The device for steering the machine comprises a pair of vertical planes 7 and 8, arranged at an angle to each other and projecting outward on each side from the back end of the machine or from brackets carried by the frame 1. Each of these planes 7 and 8, consists of or is provided with shutters 9. The shutters are pivotally connected at the middle of their ends with side pieces 10, of the rim of the plane. By opening or closing the shutters of one or the other of these planes 7 and 8, it is obviously possible to guide or direct the machine. Furthermore when the shutters are open it is evident that wind blows through the openings without exerting substantial pressure on the same. In this way the steering planes do not receive and resist undesirable wind pressure. The shutters 9, may be opened and closed in any convenient way. However, the pintles of their hinges are shown as provided with arms 11, which are connected by means of a rod 12, which in turn is connected with one end of a bell crank lever 13, the other end of which is connected with mechanism 14, by means of which it is worked. These parts constitute a shutter worker of which there are many kinds.

15, is a propeller carried by the shaft 4, and shown as arranged at the front of the machine beyond the parts thereof.

16, 17, 18 and 19, are wings which are in principle substantial duplicates so that a description of one will serve for all. Each wing is provided with shutters which close on the down stroke of the wing and open on the up stroke of the wing. In this way the operation of the wings in lifting the machine is facilitated. The shutters 30, of the wings are pivoted at one of their edges to the frame of the wing and the opening movement of the wings may be limited by providing the stops 31. The wings are pivoted to the frame 1, as at 20, and are provided with arms which are connected by links 21, with the cranks of the shaft 3. These connections are so made that when one pair of wings as 16 and 18, is on the up stroke with its shutters open the other pair of wings as 17 and 19, is on the down stroke with its shutters closed as indicated by arrows in Fig. 1. In this way one pair of wings is always lifted during the ascent of the machine. At the top there is a plane 22, the middle portion 32, of which may be solid but the side portions of which are provided with shutters 23, shown as pivoted at their ends to the marginal frame of the plane. These shutters are provided with a shutter worker by which they are opened and closed either manually or automatically or both. As shown the pintles of the hinges of the shutters are provided with arms connected with an endwise slidable rod 24.

25, is a spring tending to so position the rod 24, that the shutters 23, are closed.

26, is a spring-retracted-bell-crank-lever, one arm of which may work in a slot in the rod 24, and the other arm of which is connected as by a rod or cord 27, running over a pulley 28, to what may be called a gravity or plumb bob device 33, suspended from the frame 1. The shutters on the other side of the plane 22, are connected to the plumb bob or gravity device 33, in the manner that has been described. If a draft or current of air exerts undue pressure on for example the righthand side of the plane 22, its effect is to tip that side of the machine up. In doing this the device 33, under the influence of gravity operates the shutter worker of the righthand wing so as to open the shutters, thus relieving the wind pressure and permitting the device to right itself. If we assume that the wind raises the righthand side of the device, the plumb bob 29, will open the shutters of the righthand part of the plane 22, in the manner described but will not open the shutters of the lefthand wing because the bell crank 26, is connected with the rod 24, by a slot-and-pin connection which permits it to operate merely as a take-up for the cord or rod 27. The spring 25, holds the shutters in closed position. From the foregoing it is evident that the operation of the part 33, is by working the shutters to relieve the appropriate side of the machine from undesirable wind pressure. The shutters 23, may be worked by hand for example by moving the rods or levers 29.

In use the motor 2, is started and the crank shaft alone may be connected with it in which case the wings 16 to 18, operate to lift the machine and the shutters of these wings work in the manner described. If desired the propeller 15, may also be connected with and operated from the engine during the lifting of the machine. In fact the wings and the propeller may be worked at the same time or separately so as to position the machine at any desired elevation and so as to cause it to travel as may be desired. The shutters 23, may also be worked not only to balance the machine, as described, but also to control its descent and facilitate its ascent.

What I claim is:

1. An airship comprising a frame, movable wings provided with shutters which open on the up stroke and close on the down stroke, a plane provided with shutters which may be opened and closed, a propeller, a pair of angularly arranged steering planes respectively provided with shutters, a plumb bob device and connections for operating the shutters of the first-mentioned plane, and a motor and connections for operating the wings and propeller.

2. An airship provided with a frame, a single plane fixed or stationary in respect to the frame and having its middle portion imperforate and having at its side portions pivotal shutters ranging from the front to the back of the ship, and means for working the shutters to open those on the high side of the ship.

3. An airship provided with a frame, a single plane fixed or stationary in respect to the frame and having its middle portion imperforate and having at its side portions pivotal shutters ranging from front to back of the ship, manual means for working the shutters, and a gravity device and its connections for automatically opening the shutters on the high side of the ship.

4. An airship provided with a frame, a single plane fixed or stationary in respect to the frame and having its middle portion imperforate and having at its side portions pivotal shutters, and means for working the shutters to open those on the high side of the ship.

5. An airship provided with a frame, a pair of steering planes arranged at an inclination to the center line of the ship and fixed or stationary in respect to the frame, and each of said planes provided with shutters, and means for simultaneously opening or closing the shutters in each plane.

In testimony whereof I have hereunto signed my name.

MELVIN D. COMPTON.

Witnesses:
 ROBT. R. KITCHEL,
 FRANK E. FRENCH.